United States Patent
Jin et al.

(10) Patent No.: US 12,356,251 B2
(45) Date of Patent: Jul. 8, 2025

(54) DATA TRANSMISSION METHOD AND APPARATUS

(71) Applicant: Huawei Technologies Co., Ltd., Shenzhen (CN)

(72) Inventors: Hui Jin, Beijing (CN); Hongcheng Zhuang, Shenzhen (CN); Yun Liu, Shenzhen (CN); Fenghui Dou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 711 days.

(21) Appl. No.: 17/614,293

(22) PCT Filed: May 26, 2020

(86) PCT No.: PCT/CN2020/092324
§ 371 (c)(1),
(2) Date: Nov. 24, 2021

(87) PCT Pub. No.: WO2020/238895
PCT Pub. Date: Dec. 3, 2020

(65) Prior Publication Data
US 2022/0174547 A1    Jun. 2, 2022

(30) Foreign Application Priority Data
May 28, 2019   (CN) .......................... 201910451811.6

(51) Int. Cl.
*H04W 28/14*     (2009.01)
*H04W 76/15*     (2018.01)

(52) U.S. Cl.
CPC ........... *H04W 28/14* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 2013/0176847 A1* | 7/2013 | Zhao | H04L 47/40 370/230 |
| 2014/0056219 A1* | 2/2014 | Ye | H04L 69/16 370/328 |
| 2018/0184474 A1 | 6/2018 | Skog | |

(Continued)

FOREIGN PATENT DOCUMENTS

| CN | 106331200 A | 1/2017 |
|---|---|---|
| CN | 106507696 A | 3/2017 |
| CN | 106921690 A | 7/2017 |

(Continued)

*Primary Examiner* — Derrick W Ferris
*Assistant Examiner* — Keith Follansbee
(74) *Attorney, Agent, or Firm* — Conley Rose, P.C.

(57) ABSTRACT

A data transmission method includes that when a preset condition is met, a first terminal device establishes a first Transmission Control Protocol (TCP) connection to an application server, and establishes a second TCP connection to an application client on a second terminal device; the first terminal device receives, through the first TCP connection, first service data from the application server; the first terminal device buffers the first service data; and the first terminal device sends the first service data to the second terminal device through the second TCP connection.

20 Claims, 3 Drawing Sheets

(56) References Cited

U.S. PATENT DOCUMENTS

2018/0270170 A1* 9/2018 Shetti .................. H04L 49/9005
2019/0349308 A1   11/2019 Lin et al.

FOREIGN PATENT DOCUMENTS

| CN | 109165000 A | 1/2019 |
| CN | 109714425 A | 5/2019 |
| WO | 2016146328 A1 | 9/2016 |
| WO | 2018137158 A1 | 8/2018 |

* cited by examiner

DATA TRANSMISSION METHOD AND APPARATUS

CROSS-REFERENCE TO RELATED APPLICATIONS

This is a U.S. National Stage of International Patent Application No. PCT/CN2020/092324 filed on May 26, 2020, which claims priority to Chinese Patent Application No. 201910451811.6 filed on May 28, 2019. Both of the aforementioned applications are hereby incorporated by reference in their entireties.

TECHNICAL FIELD

This application relates to communications technologies, and in particular, to a data transmission method and apparatus.

BACKGROUND

Customer premise equipment (customer premise equipment, CPE) is a mobile signal access device that forwards a received cellular signal as a Wi-Fi signal. For example, the CPE may convert a cellular signal of a 4G communications network or a 5G communications network into a Wi-Fi signal, to support a plurality of terminal devices in connecting to the Wi-Fi signal, so as to access the internet.

The CPE establishes a communications connection to a network by using the cellular signal, and the terminal device establishes a communications connection to the CPE by using the Wi-Fi signal. Then, an application client on the terminal device establishes a transmission control protocol (Transmission Control Protocol, TCP) connection to an application server through the CPE. The application server transmits service data of the application client to the CPE through the TCP connection, and then the CPE forwards the service data to the terminal device.

It can be learned from the foregoing solution that, the CPE forwards, to the terminal device, the service data that is sent by the application server, and the CPE only forwards the service data at an internet protocol address (Internet Protocol Address, IP) layer, and cannot control transmission of the service data.

SUMMARY

Embodiments of this application provide a data transmission method and apparatus, so that a first terminal device implements transmission control on service data of a second terminal device.

According to a first aspect of the embodiments of this application, a data transmission method is provided, and includes:

A first terminal device establishes a first communications connection to a network by using a first communications technology, where the first terminal device further has a second communications connection to a second terminal device, and the second communications connection is a communications connection that is established by the second terminal device to the first terminal device by using a second communications technology; then, when a preset condition is met, the first terminal device establishes a first TCP connection to an application server, establishes a second TCP connection to an application client on the second terminal device, receives, through the first TCP connection, first service data that is sent by the application server, then buffers the first service data, and sends the first service data to the second terminal device through the second TCP connection. Therefore, in the technical solutions of this application, the first terminal device can buffer the first service data and then forward the first service data to the second terminal device, to implement transmission control on the first service data.

In a possible implementation, the preset condition includes: A service type of a service carried by a third TCP connection that has been established between the second terminal device and the application server is a preset service type. In this possible implementation, whether to enable a TCP proxy for the third TCP connection is determined by determining the service type of the service that is carried by the third TCP connection, so that the TCP proxy can be enabled, according to an actual service requirement, for a service that has a TCP proxy requirement.

In another possible implementation, the preset condition includes: The second communications connection is abnormal. In this possible implementation, when the second communications connection is abnormal, a TCP proxy is preferentially enabled for a third TCP connection. Then, the first terminal device performs transmission control on the first service data, to resolve a problem that network transmission quality on a second terminal device side is generally poor due to network instability of the second communications connection.

In another possible implementation, the preset condition includes: A service type of a service carried by a third TCP connection that has been established between the second terminal device and the application server is a preset service type, and the second communications connection is abnormal. In this possible implementation, with reference to network quality of the second communications connection and the service type of the service that is carried by the third TCP connection, the first terminal device determines whether to enable a TCP proxy for the third TCP connection, and enables, in a more targeted manner, a TCP connection for the second terminal device that actually has a TCP proxy requirement.

In another possible implementation, the preset condition includes: A service type of a service carried by a third TCP connection that has been established between the second terminal device and the application server is a preset service type, and the first terminal device determines, based on a historical exception, that the first communications connection or the second communications connection is abnormal within prediction duration. In this possible implementation, with reference to the service type of the service that is carried by the third TCP connection and an exception result that is predicted by the first terminal device based on the historical exception, the first terminal device determines whether to enable a TCP proxy for the third TCP connection, and enables, in a more targeted manner, a TCP connection for the second terminal device that actually has a TCP proxy requirement.

In another possible implementation, that the second communications connection is abnormal includes: A first download rate at which the second terminal device downloads, within first preset duration through the second communications connection, second service data carried by the third TCP connection is less than a first preset threshold; or a mean square error of first download rates at which the second terminal device downloads second service data within first preset duration through the second communications connection is greater than a second preset threshold; or a difference between a first download rate at which the second terminal device downloads second service data from the first terminal device through the second communications connection and a second download rate at which the first terminal device downloads the second service data from the application server through the first communications connection is greater than a third preset threshold.

In another possible implementation, the preset condition includes: A quantity of data packets that are successfully received by the second terminal device within second preset duration through a third TCP connection that has been established between the second terminal device and the application server is less than a fourth preset threshold. In this possible implementation, the first terminal device may further determine a network status of the second communications connection by determining the quantity of data packets that are successfully received by the second terminal device within the second preset duration through the third TCP connection. This provides another manner of determining the network status of the second communications connection.

In another possible implementation, that the first terminal device buffers the first service data includes: The first terminal device determines a first buffer that is occupied by the service carried by the third TCP connection and that is in the second terminal device; and then, the first terminal device sets a second buffer in the first terminal device for a service that is carried by the second TCP connection, where a size of the first buffer is equal to a size of the second buffer, and the first terminal device buffers the first service data in the second buffer.

In another possible implementation, the method further includes: The first terminal device adjusts the second buffer based on a third download rate and a fourth download rate, where the third download rate is a download rate at which the second terminal device downloads the first service data from the first terminal device within third preset duration through the second communications connection, and the fourth download rate is a download rate at which the first terminal device downloads the first service data from the application server within the third preset duration through the first communications connection. In this possible implementation, the first terminal device may further dynamically adjust the size of the second buffer based on a download rate, and this improves practicability of the solution in actual application.

In another possible implementation, that the first terminal device adjusts the second buffer based on a third download rate and a fourth download rate includes: When the third download rate is less than the fourth download rate, the first terminal device adjusts the second buffer to obtain an adjusted second buffer, where a size of the adjusted second buffer is equal to the size of the first buffer multiplied by a rate ratio, and the rate ratio is a ratio of the third download rate to the fourth download rate. This possible implementation provides a specific manner of dynamically adjusting the second buffer based on the download rate by the first terminal device.

In another possible implementation, that the first terminal device adjusts the second buffer based on a third download rate and a fourth download rate includes: When the third download rate is less than the fourth download rate, and current remaining space of the second buffer is less than or equal to a fifth preset threshold, the first terminal device expands the second buffer, where a size of an expanded second buffer is equal to n times the size of the unexpanded second buffer, and the size of the expanded second buffer is less than or equal to m times the size of the first buffer; or when the third download rate is less than the fourth download rate, and current remaining space of the second buffer is greater than a fifth preset threshold, the first terminal device reduces the second buffer, where a size of a reduced second buffer is equal to 1/n times the size of the unreduced second buffer, the size of the reduced second buffer is greater than or equal to the size of the first buffer and less than m times the size of the first buffer, m is greater than n, and n and m are positive integers not equal to 0. This possible implementation provides another specific manner of dynamically adjusting the second buffer based on the download rate by the first terminal device.

According to a second aspect of the embodiments of this application, a data transmission apparatus is provided. The data transmission apparatus has a method performed by the first terminal device according to any one of the possible implementations of the first aspect. The function may be implemented by hardware, or may be implemented by hardware executing corresponding software. The hardware or the software includes one or more modules corresponding to the function.

According to a third aspect of the embodiments of this application, a data transmission apparatus is provided. The data transmission apparatus includes a processor, a memory, an input/output device, and a bus, where the processor, the memory, and the input/output device are separately connected to the bus, and the memory stores computer instructions. When executing the computer instructions in the memory, the processor is configured to implement the method according to any one of the first aspect or the possible implementations of the first aspect.

According to a fourth aspect of the embodiments of this application, a chip system is provided. The chip system includes a processor, configured to support a network device in implementing a function according to any one of the first aspect or the possible implementations of the first aspect, for example, sending or processing data and/or information in the foregoing method. In a possible design, the chip system further includes a memory. The memory is configured to store program instructions and data that are necessary for the network device. The chip system may include a chip, or may include a chip and another discrete component.

According to a fifth aspect of the embodiments of this application, a computer program product including instructions is provided. When the instructions are run on a computer, the computer is enabled to perform any one of the first aspect or the possible implementations of the first aspect.

According to a sixth aspect of the embodiments of this application, a computer-readable storage medium is provided, and includes instructions. When the instructions are run on a computer, the computer is enabled to perform any one of the first aspect or the possible implementations of the first aspect.

It can be learned from the foregoing technical solutions that the embodiments of this application have the following advantages:

It can be learned from the foregoing technical solution that, when the preset condition is met, the first terminal device establishes the first TCP connection to the application server, and establishes the second TCP connection to the application client on the second terminal device. Then, the first terminal device receives, through the first TCP connection, the first service data that is sent by the application server, buffers the first service data, and sends the first service data to the second terminal device through the second TCP connection. Therefore, in the technical solutions of this application, the first terminal device can buffer the first service data and then forward the first service data to the second terminal device, to implement transmission control on the first service data.

DESCRIPTION OF EMBODIMENTS

Embodiments of this application provide a data transmission method and apparatus, so that a first terminal device implements transmission control on service data of a second terminal device.

Figure 1:
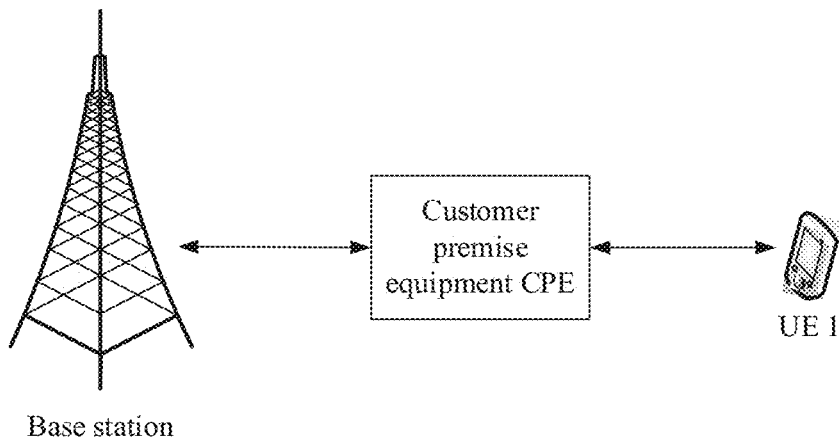
FIG. 1 is a schematic diagram of a system framework according to an embodiment of this application.

FIG. 1 is a schematic diagram of a system framework according to an embodiment of this application. FIG. 1 is a schematic diagram of a system framework applied to a 4G communications network according to an embodiment of this application. It should be noted that the embodiment of this application is also applicable to a communications network such as 3G, 5G, or even 6G. This is not specifically limited in this application. The following uses an example in which FIG. 1 is applied to the 4G communications network for description.

In the embodiments of this application, a first terminal device may be a CPE shown in FIG. 1, or may be a terminal device such as a mobile phone, a Wi-Fi box, or a mobile hotspot (mobile Wi-Fi, MiFi). An example in which the first terminal device is the CPE is used for description herein. The CPE accesses a network by using a mobile signal of the 4G communications network, that is, establishes a communications connection to an access network device. The access network device may be a gNB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, or an HNB), a BBU, a Wi-Fi access point (access point, AP), or the like. This is not specifically limited in this application. An example in which the access network device shown in FIG. 1 is a base station is used for description herein. The CPE establishes the communications connection to the base station by using the mobile signal of the 4G communications network, receives the mobile signal of the 4G communications network, and forwards the mobile signal of the 4G communications network as a Wi-Fi signal. A second terminal device in the embodiments of this application is also referred to as user equipment (user equipment, UE), a mobile station (mobile station, MS), a mobile terminal (mobile terminal, MT), or the like, and is a device that provides voice/data connectivity for a user, for example, a handheld device with a wireless connection function and the like. An example in which UE 1 shown in FIG. 1 is the second terminal device is used for description herein. In this case, the UE 1 may establish a communications connection to the CPE by using the Wi-Fi signal. Then, an application client on the UE 1 may establish a TCP connection to an application server through the CPE, and receive, through the TCP connection, service data that is sent by the application server.

It can be learned that the second terminal device establishes the TCP connection to the application server through the first terminal device. Then, the first terminal device receives the service data that is sent by the application server to the second terminal device, and forwards the service data to the second terminal device. In this process, the first terminal device only forwards the service data, but cannot control transmission of the service data. Further, when signal strength of the communications connection that is established between the first terminal device and the second terminal device by using the Wi-Fi signal is relatively unstable, the first terminal device cannot resolve a problem of a low data transmission rate at a TCP layer caused by the unstable Wi-Fi signal. In view of this, the embodiments of this application provide a data transmission method, so that the first terminal device implements transmission control on the service data of the second terminal device.

Figure 2:
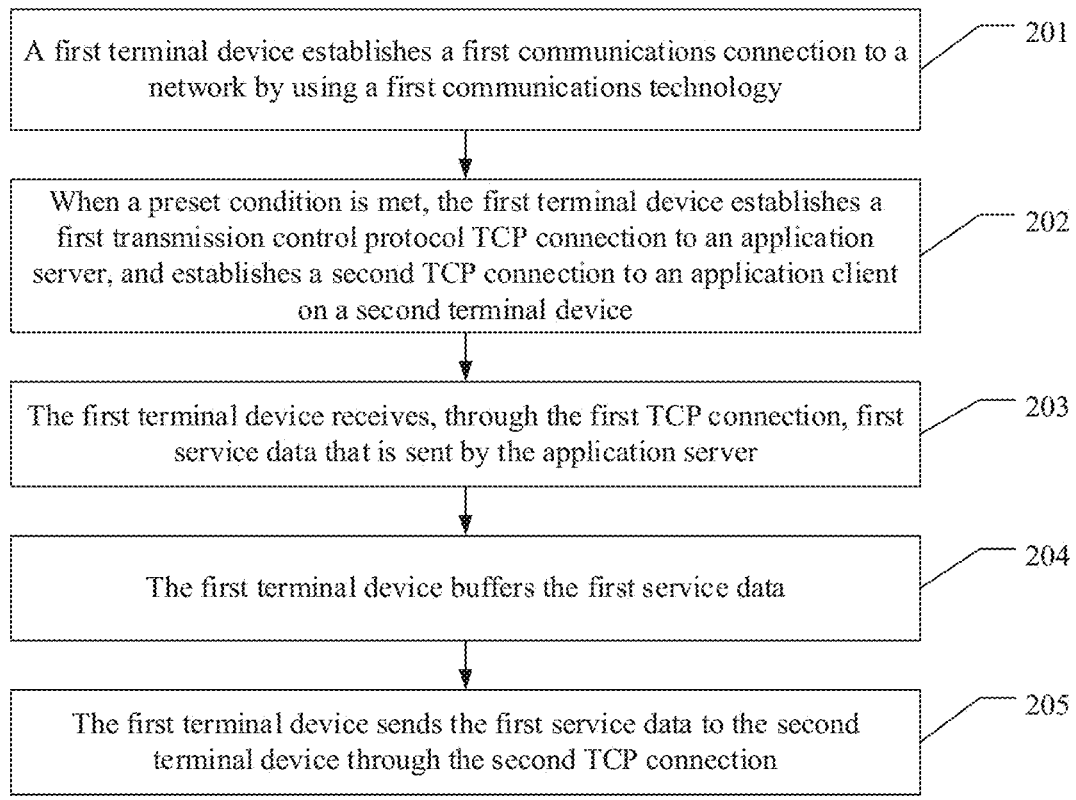
FIG. 2 is a schematic diagram of an embodiment of a data transmission method according to an embodiment of this application.

The following describes the data transmission method according to the embodiments of this application. FIG. 2 is a schematic diagram of an embodiment of the data transmission method according to an embodiment of this application. The method includes the following steps.

201: A first terminal device establishes a first communications connection to a network by using a first communications technology.

The first communications technology may be a cellular network communications technology, and the first terminal device uses a cellular signal of a cellular network (for example, a mobile signal of a 4G or 5G communications network) to access the network. A second terminal device may establish a second communications connection to the first terminal device by using a second communications technology. In the second communications technology, the second communications connection may be established to the first terminal device by using a Wi-Fi signal.

202: When a preset condition is met, the first terminal device establishes a first TCP connection to an application server, and establishes a second TCP connection to an application client on the second terminal device.

It can be learned from step 201 that after the second terminal device establishes the second communications connection to the first terminal device by using the second communications technology, when an application client has a service requirement, the application client on the second terminal device may establish a third TCP connection to the application server through the first terminal device. Then, the application server transmits second service data to the first terminal device through the third TCP connection. When the preset condition is met, the first terminal device may enable a TCP proxy for the third TCP connection. A specific process is as follows: The first terminal device establishes the first TCP connection to the application server, and establishes the second TCP connection to the second terminal device. At this time, the second terminal device disconnects the established third TCP connection from the application server, and receives, through the second TCP connection, first service data that is sent by the first terminal device. There are a plurality of preset conditions. The following describes examples of the preset conditions.

1. A service type of a service carried by the third TCP connection is a preset service type.

In this embodiment of this application, the first terminal device enables a TCP proxy for some specific services. The specific service may be understood as a service that requires a relatively large service data amount and a relatively low latency, for example, web browsing, an audio and video service, image download, or small video download. Therefore, the first terminal device can determine whether the service type of the service carried by the third TCP connection is the preset service type. If the service type of the service carried by the third TCP connection is the preset service type, the first terminal device may determine that the preset condition is met. For example, the third TCP connection carries data of a video that is watched by using an iQIYI client on the second terminal device, and it can be determined that the service is a video service. In this case, the first terminal device enables the TCP proxy for the third TCP connection.

2. The second communications connection is abnormal.

That the second communications connection is abnormal may include one of the following cases:

a. A first download rate at which the second terminal device downloads, within first preset duration through the second communications connection, the second service data carried by the third TCP connection is less than a first preset threshold.

It should be noted that the first download rate may be a download rate at a time point, or may be an average download rate of the second terminal device within first preset duration, for example, an average value of download rates within one day. The first preset threshold may be a historical average download rate that is calculated by the second terminal device based on a historical download rate at which the second terminal device downloads the second service data that is carried by the third TCP connection. When the first download rate is less than the first preset threshold, the first terminal device may enable the TCP proxy for the third TCP connection.

b. A mean square error of first download rates at which the second terminal device downloads, within first preset duration through the second communications connection, the second service data carried by the third TCP connection is greater than a second preset threshold.

It should be noted that when the mean square error of the first download rates is greater than the second preset threshold, it may be understood that, within the first preset duration, the first download rate of the second terminal device changes greatly, and the network is relatively unstable. When the mean square error of the first download rates is greater than the second preset threshold, the first terminal device may enable the TCP proxy for the third TCP connection.

c. A difference between a first download rate at which the second terminal device downloads, through the second communications connection, the second service data carried by the third TCP connection and a second download rate at which the first terminal device downloads, through the first communications connection, the second service data carried by the third TCP connection is greater than a third preset threshold.

When the first download rate is less than the second download rate, if the difference between the first download rate and the second download rate is greater than the third preset threshold, it may be understood that the second communications connection is abnormal. In this case, the first terminal device may enable the TCP proxy for the third TCP connection.

3. A service type of a service carried by the third TCP connection is a preset service type, and the second communications connection is abnormal.

4. A service type of a service carried by the third TCP connection is a preset service type, and the first terminal device determines, based on a historical exception, that the first communications connection or the second communications connection is abnormal within the first duration.

The historical exception includes a cause of the historical exception (for example, the first communications connection or the second communications connection is abnormal) and features of the exception (for example, a time point or time period at which the exception occurs, and a type of an application in which the exception occurs). The first terminal device may predict a time point at which an exception occurs again, features of the exception, or the like based on the historical exception. For example, from 6:00 to 7:00 every night, many family members use an iQIYI client to watch videos, and this causes a poor Wi-Fi signal. In this case, the first terminal device may determine that the first communications connection may be abnormal in the time period from 6:00 to 7:00 every night. Therefore, the first terminal device may enable the TCP proxy for the third TCP connection. However, in the time period from 6:00 to 7:00 every night, because radio resources of the base station are limited, if a plurality of first terminal devices simultaneously request large-bandwidth resources, there is a problem that requests of all the first terminal devices cannot be fully met, and then the first communications connection is abnormal.

5. A quantity of data packets that are successfully received by the second terminal device within second preset duration through a third TCP connection that has been established between the second terminal device and the application server is less than a fourth preset threshold.

Optionally, the first terminal device may determine, by using an ACK packet sent by the second terminal device, the quantity of data packets that are successfully received by the second terminal device in unit time. When the quantity of data packets is less than the fourth preset threshold, the first terminal device may determine that the network of the first communications connection is relatively poor, so that the first terminal device may determine that the preset condition is met. For example, the application server sends 10 data packets to the second terminal device in unit time through the third TCP connection, and the first terminal device determines, by using the ACK packet fed back by the second terminal device, that the second terminal device receives only four data packets within the unit time. The fourth preset threshold is 5. In this case, the first terminal device determines that the quantity of data packets is less than 5, and therefore, the first terminal device determines that the preset condition is met.

203: The first terminal device receives, through the first TCP connection, the first service data that is sent by the application server.

After enabling the TCP proxy for the third TCP connection, the first terminal device may receive, through the first TCP connection established to the application server, the first service data that is sent by the first terminal device.

204: The first terminal device buffers the first service data.

Figure 3:
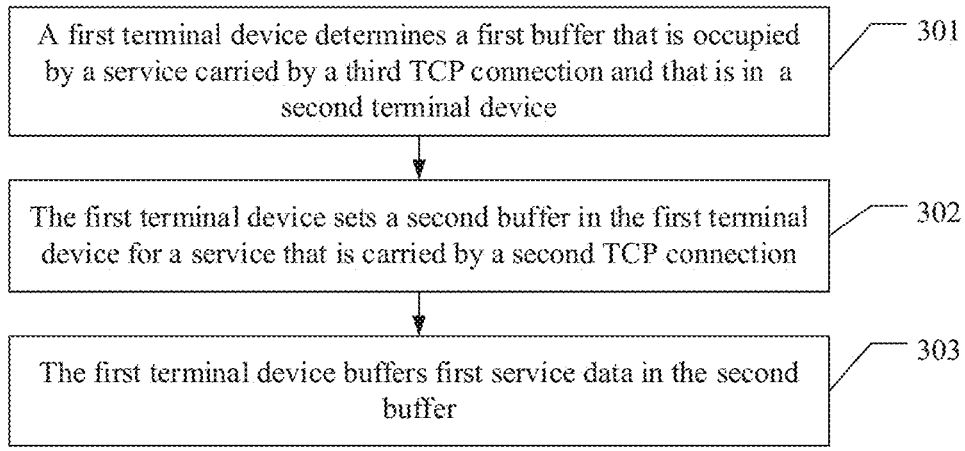
FIG. 3 is a schematic diagram of another embodiment of a data transmission method according to an embodiment of this application.

A specific process in which the first terminal device buffers the first service data is shown in FIG. 3, and includes the following steps.

301: The first terminal device determines a first buffer that is occupied by the service carried by the third TCP connection and that is in the second terminal device.

After establishing the third TCP connection to the application server through the first terminal device, the second terminal device sets the first buffer for the third TCP connection to buffer service data that is received by the second terminal device through the third TCP connection. In this case, the first terminal device may determine a size of the first buffer. Specifically, when the second terminal device establishes the third TCP connection to the application server, the first terminal device may determine a receive window, namely, the size of the first buffer, of the third TCP connection based on a TCP message that is sent by the second terminal device to the application server.

302: The first terminal device sets a second buffer in the first terminal device for a service that is carried by the first TCP connection.

After determining the size of the first buffer, the second terminal device may set the second buffer in the first terminal device for the service that is carried by the first TCP connection, where a size of the second buffer is equal to the size of the first buffer.

303: The first terminal device buffers the first service data in the second buffer.

The first terminal device may buffer, in the second buffer, the first service data that is sent by the application server to the first terminal device through the first TCP connection. Specifically, after setting the second buffer, the first terminal device may request an application proxy module in the first terminal device to execute a fast-sending command, so as to download the first service data more quickly, and buffer the first service data in the second buffer.

205: The first terminal device sends the first service data to the second terminal device through the second TCP connection.

The first terminal device may send the buffered first service data to the second terminal device through the second TCP connection. When sending the first service data to the second terminal device through the second TCP connection, the first terminal device may control transmission of the first service data. For example, when a Wi-Fi signal between the first terminal device and the second terminal device is relatively poor, the first terminal device may adjust a sliding window of the second TCP connection, so that the first terminal device sends a corresponding data packet according to a receiving capability of the second terminal device in this environment. When the Wi-Fi signal between the first terminal device and the second terminal device recovers to a good state, the first terminal device may quickly adjust the sliding window of the second TCP connection. In this case, the first terminal device can send the corresponding data packet according to a current receiving capability of the second terminal device. This can avoid or prevent a problem that network transmission quality on a user side is generally poor because the sliding window of the second TCP connection cannot be quickly adjusted to an appropriate size according to a strength status of the Wi-Fi signal.

Figure 4:
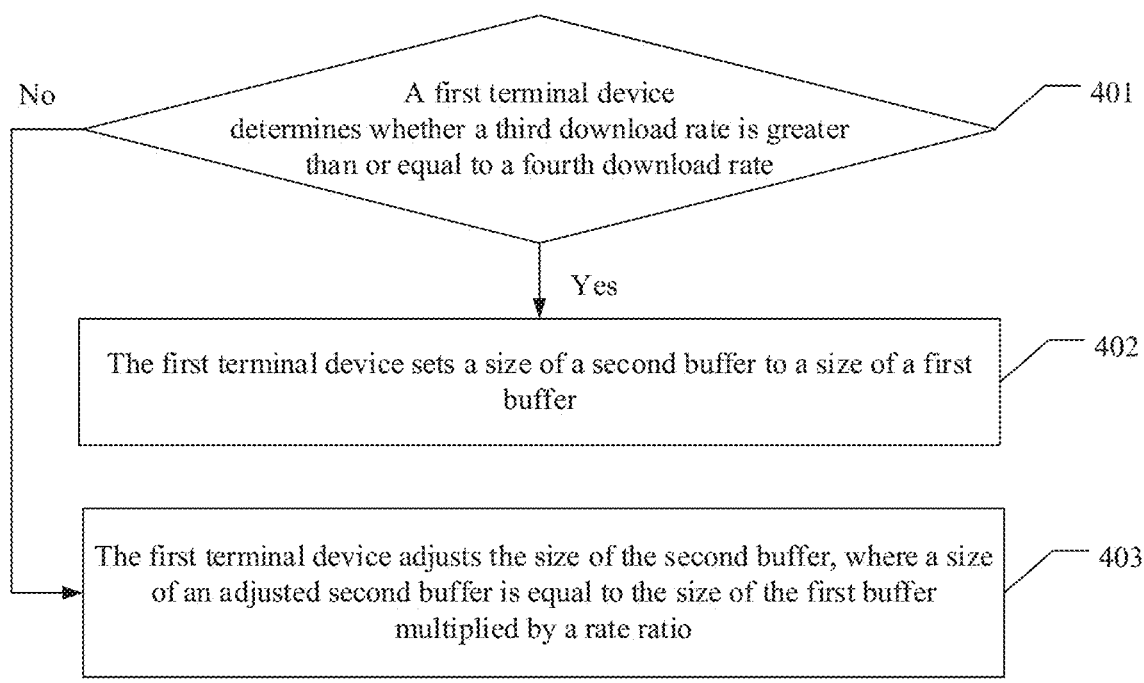
FIG. 4 is a schematic diagram of another embodiment of a data transmission method according to an embodiment of this application.

Optionally, in this embodiment of this application, after setting the second buffer, the second terminal device may dynamically adjust the size of the second buffer based on a third download rate and a fourth download rate. The third download rate is a download rate at which the second terminal device downloads the first service data from the first terminal device within third preset duration through the second communications connection, and the fourth download rate is a download rate at which the first terminal device downloads the first service data within the third preset duration through the first communications connection. Specifically, a specific process of adjusting the second buffer by the second terminal device is described in detail in FIG. 4. Refer to FIG. 4, the process includes the following steps.

401: The first terminal device determines whether the third download rate is greater than or equal to the fourth download rate. If the third download rate is greater than or equal to the fourth download rate, step 402 is performed; or if the third download rate is less than the fourth download rate, step 403 is performed.

402: The first terminal device adjusts the size of the second buffer to the size of the first buffer.

When the third download rate is greater than or equal to the fourth download rate, the second terminal device may set the size of the second buffer to the size of the first buffer.

403: The first terminal device adjusts the size of the second buffer, where a size of an adjusted second buffer is equal to the size of the first buffer multiplied by a rate ratio.

When the third download rate is less than the fourth download rate, the first terminal device adjusts the second buffer to obtain the adjusted second buffer, where the size of the adjusted second buffer is equal to the size of the first buffer multiplied by the rate ratio, and the rate ratio is a ratio of the third download rate to the fourth download rate.

Optionally, when the third download rate is less than the fourth download rate, the second buffer may be further specifically adjusted in the following manner: When current remaining space of the second buffer is less than or equal to a fifth preset threshold, the first terminal device expands the second buffer, where a size of an expanded second buffer is equal to n times the size of the unexpanded second buffer, and the size of the expanded second buffer is less than or equal to m times the size of the first buffer; or when current remaining space of the second buffer is greater than a fifth preset threshold, the CPE reduces the second buffer, where a size of a reduced second buffer is equal to 1/n times the size of the unreduced second buffer, the size of the reduced second buffer is greater than or equal to the size of the first buffer and less than m times the size of the first buffer, m is greater than n, and n and m are positive integers not equal to 0.

For example, a current buffer size of the second buffer is equal to a size of a receive window (receive window, RWND) of the UE. When a size of the current remaining space of the second buffer is 10% of the current buffer size, the first terminal device expands the second buffer. For example, the first terminal device expands the current buffer size of the second buffer to twice the current buffer size. That is, the size of the second buffer is 2×RWND.

If the current buffer size of the second buffer is 8×RWND, when the size of the current remaining space of the second buffer is 90% of the current buffer size, the first terminal device reduces the second buffer. For example, the first terminal device reduces the current buffer size of the second buffer to ½ times the current buffer size. That is, the size of the second buffer is 4×RWND.

It should be noted that there is a limit to expand or reduce the second buffer by the first terminal device. The size of the adjusted second buffer is greater than or equal to the size of the first buffer and less than or equal to m times the size of the first buffer. For example, if the size of the first buffer is equal to the RWND of the UE, and m is 10, a size of an adjusted first buffer is greater than or equal to the RWND and less than or equal to 10×RWND.

In this embodiment of this application, the first terminal device transmits, through the second TCP connection at a TCP layer, the first service data to a Wi-Fi layer of the first terminal device, and then transmits the first service data to the second terminal device at the Wi-Fi layer. After sending the first service data at the TCP layer, the first terminal device starts a first timer to determine whether the ACK packet sent by the second terminal device is received within duration of the first timer. If the first terminal device does not receive the ACK packet within the duration of the first timer, the first terminal device resends the first service data at the TCP layer. After the first service data sent at the TCP layer is received at the Wi-Fi layer of the first terminal device, the first terminal device starts a second timer at the Wi-Fi layer. If the first terminal device does not send the first service data to the second terminal device within duration of the second timer, the first terminal device performs packet loss processing on the first service data. Therefore, in this embodiment of this application, to successfully transmit the buffered first service data to a second terminal device side, the first terminal device may adjust the first timer and the second timer, so that durations of the two timers are consistent and synchronized. In addition, the first terminal device may increase a quantity of ACK packets that are allowed to be retransmitted by the second terminal device, so that the second terminal device reports a data receiving status by using the ACK packet, and the first terminal device sends, based on the ACK packet, the service data that fails to be received by the second terminal device.

In this embodiment of this application, when the preset condition is met, the first terminal device establishes the first TCP connection to the application server, and establishes the second TCP connection to the application client on the second terminal device. Then, the first terminal device receives, through the first TCP connection, the first service data that is sent by the application server, buffers the first service data, and then sends the first service data to the second terminal device through the second TCP connection. Therefore, in the technical solutions of this application, the first terminal device can buffer the first service data and then forward the first service data to the second terminal device, to implement transmission control on the first service data.

Figure 5:
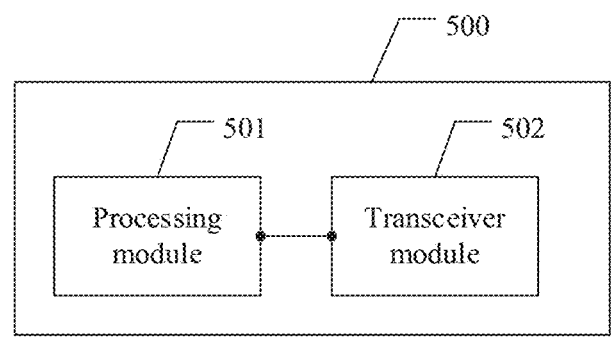
FIG. 5 is a schematic structural diagram of a data transmission apparatus according to an embodiment of this application.

The following describes a data transmission apparatus 500 provided in an embodiment of this application. Refer to FIG. 5, an embodiment of the data transmission apparatus 500 in the embodiments of this application includes a processing module 501 and a transceiver module 502.

The processing module 501 is configured to establish a first communications connection to a network by using a first communications technology, where the data transmission apparatus further has a second communications connection to a second terminal device, and the second communications connection is a communications connection that is established by the second terminal device to the data transmission apparatus by using a second communications technology.

The processing module 501 is further configured to: when a preset condition is met, establish a first transmission control protocol TCP connection to an application server, and establish a second TCP connection to an application client on the second terminal device.

The transceiver module 502 is configured to receive, through the first TCP connection, first service data that is sent by the application server.

The processing module 501 is further configured to buffer the first service data.

The transceiver module 502 is further configured to send the first service data to the second terminal device through the second TCP connection.

In a possible implementation, the preset condition includes:

A service type of a service carried by a third TCP connection that has been established between the second terminal device and the application server is a preset service type.

In another possible implementation, the preset condition includes: The second communications connection is abnormal.

In another possible implementation, the preset condition includes: A service type of a service carried by a third TCP connection that has been established between the second terminal device and the application server is a preset service type, and the second communications connection is abnormal.

In another possible implementation, the preset condition includes: A service type of a service carried by a third TCP connection that has been established between the second terminal device and the application server is a preset service type, and the data transmission apparatus determines, based on a historical exception, that the first communications connection or the second communications connection is abnormal within prediction duration.

In another possible implementation, that the second communications connection is abnormal includes: A first download rate at which the second terminal device downloads, within first preset duration through the second communications connection, second service data carried by the third TCP connection is less than a first preset threshold; or a mean square error of first download rates at which the second terminal device downloads second service data within first preset duration through the second communications connection is greater than a second preset threshold; or a difference between a first download rate at which the second terminal device downloads second service data from the data transmission apparatus through the second communications connection and a second download rate at which the data transmission apparatus downloads the second service data from the application server through the first communications connection is greater than a third preset threshold.

In another possible implementation, the preset condition includes: A quantity of data packets that are successfully received by the second terminal device within second preset duration through a third TCP connection that has been established between the second terminal device and the application server is less than a fourth preset threshold.

In another possible implementation, the processing module 501 is specifically configured to:

determine a first buffer that is occupied by the service carried by the third TCP connection and that is in the second terminal device;

set a second buffer in the data transmission apparatus for a service that is carried by the second TCP connection, where a size of the first buffer is equal to a size of the second buffer; and buffer the first service data in the second buffer.

In another possible implementation, the processing module 501 is further configured to:

adjust the second buffer based on a third download rate and a fourth download rate, where the third download rate is a download rate at which the second terminal device downloads the first service data from the data transmission apparatus within third preset duration through the second communications connection, and the fourth download rate is a download rate at which the data transmission apparatus downloads the first service data from the application server within the third preset duration through the first communications connection.

In another possible implementation, the processing module 501 is specifically configured to:

when the third download rate is less than the fourth download rate, adjust the second buffer to obtain an adjusted second buffer, where a size of the adjusted second buffer is equal to the size of the first buffer multiplied by a rate ratio, and the rate ratio is a ratio of the third download rate to the fourth download rate.

In another possible implementation, the processing module 501 is specifically configured to:

when the third download rate is less than the fourth download rate, and current remaining space of the second buffer is less than or equal to a fifth preset threshold, expand the second buffer, where a size of an expanded second buffer is equal to n times the size of the unexpanded second buffer, and the size of the expanded second buffer is less than or equal to m times the size of the first buffer; or when the third download rate is less than the fourth download rate, and current remaining space of the second buffer is greater than a fifth preset threshold, reduce the second buffer, where a size of a reduced second buffer is equal to 1/n times the size of the unreduced second buffer, the size of the reduced second buffer is greater than or equal to the size of the first buffer and less than m times the size of the first buffer, m is greater than n, and n and m are positive integers not equal to 0.

In the embodiments of this application, the processing module 501 establishes the first communications connection to the network by using the first communications technology, where the processing module 501 further has the second communications connection to the second terminal device, and the second communications connection is the communications connection established by the second terminal device to the data transmission apparatus by using the second communications technology. The processing module 501 is configured to: when a preset condition is met, establish the first TCP connection to the application server, and establish the second TCP connection to the application client on the second terminal device. The transceiver module 502 receives, through the first TCP connection, the first service data that is sent by the application server. Then, the processing module 501 buffers the first service data, and the transceiver module 502 sends the first service data to the second terminal device through the second TCP connection. Therefore, in the technical solutions of this application, the processing module 501 can buffer the first service data, and then forward the first service data to the second terminal device through the transceiver module 502, to implement transmission control on the first service data.

Figure 6:
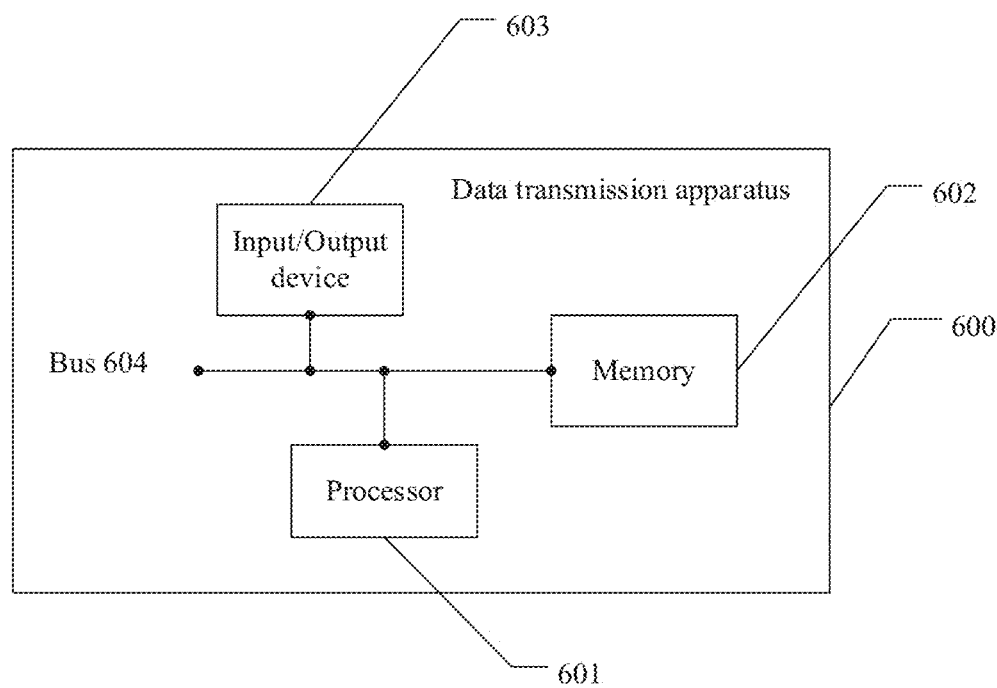
FIG. 6 is another schematic structural diagram of a data transmission apparatus according to an embodiment of this application.

This application further provides another data transmission apparatus 600. Refer to FIG. 6, an embodiment of the data transmission apparatus 600 in the embodiments of this application includes:

a processor 601, a memory 602, an input/output device 603, and a bus 604.

In a possible implementation, the processor 601, the memory 602, and the input/output device 603 are separately connected to the bus 604, and the memory stores computer instructions.

The processing module 501 in the foregoing embodiments may be specifically the processor 601 in this embodiment. Therefore, specific implementation of the processor 601 is not described again. The transceiver module 502 in the foregoing embodiments may be specifically the input/output device 603 in this embodiment. Therefore, specific implementation of the input/output device 603 is not described again.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method implemented by a first terminal device, wherein the method comprises:
    establishing, using a first communications technology, a first communications connection to a network;
    obtaining, using a second terminal device and a second communications technology, a second communications connection with the second terminal device;
    when a preset condition is met:
        establishing a first Transmission Control Protocol (TCP) connection to an application server;
        establishing a second TCP connection to an application client on the second terminal device;
        receiving, from the application server and through the first TCP connection, first service data;
        buffering the first service data in a second buffer by:
            obtaining a first buffer that is occupied by a first service carried by a third TCP connection and that is in a second terminal device;
            setting the second buffer in the first terminal device for a second service that is carried by the second TCP connection, wherein a first size of the first buffer is equal to a second size of the second buffer;
            adjusting the second buffer based on a first download rate and a second download rate, wherein the first download rate is a first rate at which the second terminal device downloads the first service data from the first terminal device within a first preset duration through the second communications connection, and wherein the second download rate is a second rate at which the first terminal device downloads the first service data from the application server within the first preset duration through the first communications connection; and
            buffering the first service data in the second buffer; and
        sending, through the second TCP connection, the first service data to the second terminal device,
    wherein the preset condition comprises a quantity of data packets that are successfully received by the second terminal device within a second preset duration through the third TCP connection is less than a preset threshold, and
    wherein the third TCP connection is between the second terminal device and the application server.

2. The method of claim 1, wherein the preset condition comprises service type of a service carried by the third TCP connection is a preset service type.

3. The method of claim 1, wherein the preset condition comprises the second communications connection is abnormal.

4. The method of claim 3, wherein the second communications connection is abnormal when:
    a third download rate at which the second terminal device downloads, from the first terminal device within a third preset duration through the second communications connection, second service data carried by the third TCP connection is less than a first preset threshold;
    a mean square error of first download rates at which the second terminal device downloads the second service data is greater than a second preset threshold; or
    a difference between the third download rate and a fourth download rate at which the first terminal device downloads the second service data from the application server through the first communications connection is greater than a third preset threshold.

5. The method of claim 1, wherein the preset condition comprises:
    a service type of a service carried by the third TCP connection is a preset service type; and
    the second communications connection is abnormal.

6. The method of claim 1, wherein the preset condition comprises:
    a service type of a service carried by the third TCP connection is a preset service type; and
    determining, based on a historical exception, that the first communications connection or the second communications connection is abnormal within a prediction duration.

7. The method of claim 1, further comprising:
    identifying that the first download rate is less than the second download rate;
    further adjusting, in response to identifying, the second buffer to obtain an adjusted second buffer, wherein a third size of the adjusted second buffer is equal to the first size multiplied by a rate ratio, and wherein the rate ratio is a ratio of the first download rate to the second download rate.

8. The method of claim 1, wherein the first download rate is less than the second download rate, and wherein the method further comprises:
    the second buffer to obtain an expanded second buffer when a current remaining space of the second buffer is less than or equal to a fifth preset threshold, wherein a third size of the expanded second buffer is equal to n times the second size is less than or equal to m times the first size; and
    reducing the second buffer to obtain a reduced second buffer when the current remaining space is greater than the fifth preset threshold, wherein a fourth size of the reduced second buffer is equal to 1/n times the second size and is greater than or equal to the first size and less than m times the first size, wherein m is greater than n, and wherein n and m are positive integers not equal to zero.

9. A first terminal device, comprising:
    a memory configured to store computer instructions; and
    a processor coupled to the memory, wherein the computer instructions cause the processor to be configured to:
        establish, using a first communications technology, a first communications connection to a network;
        obtain, using a second terminal device and a second communications technology, a second communications connection with the second terminal device;
        when a preset condition is met:
            establish a first Transmission Control Protocol (TCP) connection to an application server;
            establish a second TCP connection to an application client on the second terminal device;
            receive, from the application server and through the first TCP connection, first service data;
            buffer the first service data in a second buffer by:
                obtaining a first buffer that is occupied by a first service carried by a third TCP connection and that is in a second terminal device;
                setting the second buffer in the first terminal device for a second service that is carried by the second TCP connection, wherein a first size of the first buffer is equal to a second size of the second buffer;

adjusting the second buffer based on a first download rate and a second download rate, wherein the first download rate is a first rate at which the second terminal device downloads the first service data from the first terminal device within a first preset duration through the second communications connection, and wherein the second download rate is a second rate at which the first terminal device downloads the first service data from the application server within the first preset duration through the first communications connection; and buffering the first service data in the second buffer; and send, through the second TCP connection, the first service data to the second terminal device, wherein the preset condition comprises a quantity of data packets that are successfully received by the second terminal device within a second preset duration through a third TCP connection is less than a preset threshold, and wherein the third TCP connection is between the second terminal device and the application server.

10. The first terminal device of claim 9, wherein the preset condition comprises a service type of a service carried by the third TCP connection is a preset service type.

11. The first terminal device of claim 9, wherein the preset condition comprises the second communications connection is abnormal.

12. The first terminal device of claim 11, wherein the second communications connection is abnormal when:
a third download rate at which the second terminal device downloads, from the first terminal device within a third preset duration through the second communications connection, second service data carried by the third TCP connection is less than a first preset threshold;
a mean square error of first download rates at which the second terminal device downloads the second service data is greater than a second preset threshold; or
a difference between the third download rate and a fourth download rate at which the first terminal device downloads the second service data from the application server through the first communications connection is greater than a third preset threshold.

13. The first terminal device of claim 9, wherein the preset condition comprises:
a service type of a service carried by the third TCP connection is a preset service type; and
the second communications connection is abnormal.

14. The first terminal device of claim 9, wherein the preset condition comprises:
a service type of a service carried by the third TCP connection is a preset service type; and
determining, based on a historical exception, that the first communications connection or the second communications connection is abnormal within a prediction duration.

15. A computer program product comprising computer executable instructions that are stored on a non-transitory computer-readable medium and that, when executed by a processor, cause a first terminal device to:
establish, using a first communications technology, a first communications connection to a network;

obtain, using a second terminal device and a second communications technology, a second communications connection with the second terminal device;

when a preset condition is met:
establish a first Transmission Control Protocol (TCP) connection to an application server;
establish a second TCP connection to an application client on the second terminal device;
receive, from the application server and through the first TCP connection, first service data;
buffer the first service data in a second buffer by:
obtaining a first buffer that is occupied by a first service carried by a third TCP connection and that is in a second terminal device;
setting the second buffer in the first terminal device for a second service that is carried by the second TCP connection, wherein a first size of the first buffer is equal to a second size of the second buffer;
adjusting the second buffer based on a first download rate and a second download rate, wherein the first download rate is a first rate at which the second terminal device downloads the first service data from the first terminal device within a first preset duration through the second communications connection, and wherein the second download rate is a second rate at which the first terminal device downloads the first service data from the application server within the first preset duration through the first communications connection; and
buffering the first service data in the second buffer; and
send, through the second TCP connection, the first service data to the second terminal device,
wherein the preset condition comprises a quantity of data packets that are successfully received by the second terminal device within a second preset duration through a third TCP connection is less than a preset threshold, and
wherein the third TCP connection is between the second terminal device and the application server.

16. The computer program product of claim 15, wherein the preset condition comprises service type of a service carried by the third TCP connection is a preset service type.

17. The computer program product of claim 15, wherein the preset condition comprises the second communications connection is abnormal.

18. The computer program product of claim 17, wherein the second communications connection is abnormal when a third download rate at which the second terminal device downloads, from the first terminal device within a third preset duration through the second communications connection, second service data carried by the third TCP connection is less than a first preset threshold.

19. The computer program product of claim 17, wherein the second communications connection is abnormal when a mean square error of first download rates at which the second terminal device downloads the second service data is greater than a second preset threshold.

20. The computer program product of claim 17, wherein the second communications connection is abnormal when a difference between a third download rate at which the second terminal device downloads, from the first terminal device within a third preset duration through the second communications connection, second service data carried by the third TCP connection and a fourth download rate at which the first terminal device downloads the second service data from the application server through the first communications connection is greater than a third preset threshold.

* * * * *